(12) United States Patent  
Stocks

(10) Patent No.: US 8,427,987 B2  
(45) Date of Patent: Apr. 23, 2013

(54) SYSTEM AND METHOD FOR TIME SYNCHRONIZED BEACON ENABLED WIRELESS PERSONAL AREA NETWORK COMMUNICATION

(75) Inventor: Benjamin M. Stocks, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1102 days.

(21) Appl. No.: 12/170,345

(22) Filed: Jul. 9, 2008

(65) Prior Publication Data

US 2010/0008273 A1    Jan. 14, 2010

(51) Int. Cl.
*G08C 17/00* (2006.01)

(52) U.S. Cl.
USPC ............................................. 370/311

(58) Field of Classification Search .......... 370/329–350, 370/503–519
See application file for complete search history.

(56) References Cited

U.S. PATENT DOCUMENTS

| | | | | |
|---|---|---|---|---|
| 6,597,683 | B1 * | 7/2003 | Gehring et al. | 370/348 |
| 7,653,017 | B2 * | 1/2010 | Huylebroeck | 370/311 |
| 7,990,909 | B2 * | 8/2011 | Brueckheimer | 370/324 |
| 2002/0123345 | A1 * | 9/2002 | Mahany et al. | 455/432 |
| 2005/0094640 | A1 * | 5/2005 | Howe | 370/395.1 |
| 2008/0291891 | A1 * | 11/2008 | Jerlhagen et al. | 370/350 |
| 2008/0311957 | A1 * | 12/2008 | Jantunen et al. | 455/560 |
| 2009/0154487 | A1 * | 6/2009 | Ryan et al. | 370/445 |
| 2009/0323720 | A1 * | 12/2009 | Salokannel et al. | 370/468 |

OTHER PUBLICATIONS

David L. Mills; Network time Protocol (Version 3) Specification, Implementation and Analysis; Mar. 1992; pp. 1-100; University of Delaware.

IEEE Part 15.4: Wireless Medium Access Control (MAC) and Physical Layer (PHY) Specifications for Low-Rate Wireless Personal Area Networks (WPANs); Sep. 8, 2006; pp. 1-323; IEEE Std 802.15.4™-2006 (Revision of IEEE Std 802.15.4-2003; New York, NY.

* cited by examiner

*Primary Examiner* — Thai Hoang
(74) *Attorney, Agent, or Firm* — Fletcher Yoder; R. Scott Speroff; John M. Miller

(57) ABSTRACT

Systems and methods for network synchronization are included. For example, a method for network synchronization may include wirelessly communicating a beacon over a wireless personal area network, in which the beacon may include a beacon payload having a timestamp of a master clock for synchronization of a local clock of a device on the wireless personal area network. The method may also include receiving the beacon in the device, obtaining the timestamp from the beacon payload, and setting the local clock based on the timestamp of the master clock. Another beacon may also be communicated. The other beacon may include another beacon payload having a follow up message for synchronization of the local clock of the device.

21 Claims, 6 Drawing Sheets

SYSTEM AND METHOD FOR TIME SYNCHRONIZED BEACON ENABLED WIRELESS PERSONAL AREA NETWORK COMMUNICATION

BACKGROUND

The invention relates generally to communication across components in a beacon enabled wireless personal area network. More particularly, the invention relates to a technique for synchronizing the local clocks of personal area network nodes.

A wireless personal area network allows wireless communication among local devices of the network, generally employing lower data rates and operating at lower power. In a beacon enabled wireless personal area network, such as a network adhering to IEEE standard 802.15.4, a network controller may send messages known as beacons to all devices of the network to specify when local devices may send and receive messages.

In the beacon enabled wireless personal area network, communication among the local devices and communication between the local devices and the network controller may take place during a series of device communication slots collectively known as a superframe. A superframe is bounded by beacons, e.g., a first beacon may indicate the start of a superframe and a second beacon may indicate the end. Devices may be scheduled to communicate during one or more of the superframe slots. Because the personal area network may utilize a low data rate, the availability of the superframe slots may be limited, particularly as the number of local devices on the personal area network increases. Moreover, local devices in a power save mode may periodically exit the power save mode to listen for beacons, which consumes power. The local devices in the power save mode may also periodically exit the power save mode to listen for time synchronization messages in one or more of the superframe slots, consuming additional power.

BRIEF DESCRIPTION

Embodiments of the invention include systems and methods for network synchronization. For example, a method for network synchronization may include wirelessly communicating a beacon over a wireless personal area network. The beacon may include a beacon payload having a timestamp of a master clock for synchronization of a local clock of a device on the wireless personal area network. The method may also include receiving the beacon in the device, obtaining the timestamp from the beacon payload, and setting the local clock based on the timestamp of the master clock. Additionally, another beacon may be communicated. The other beacon may include another beacon payload having a follow up message for synchronization of the local clock of the device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
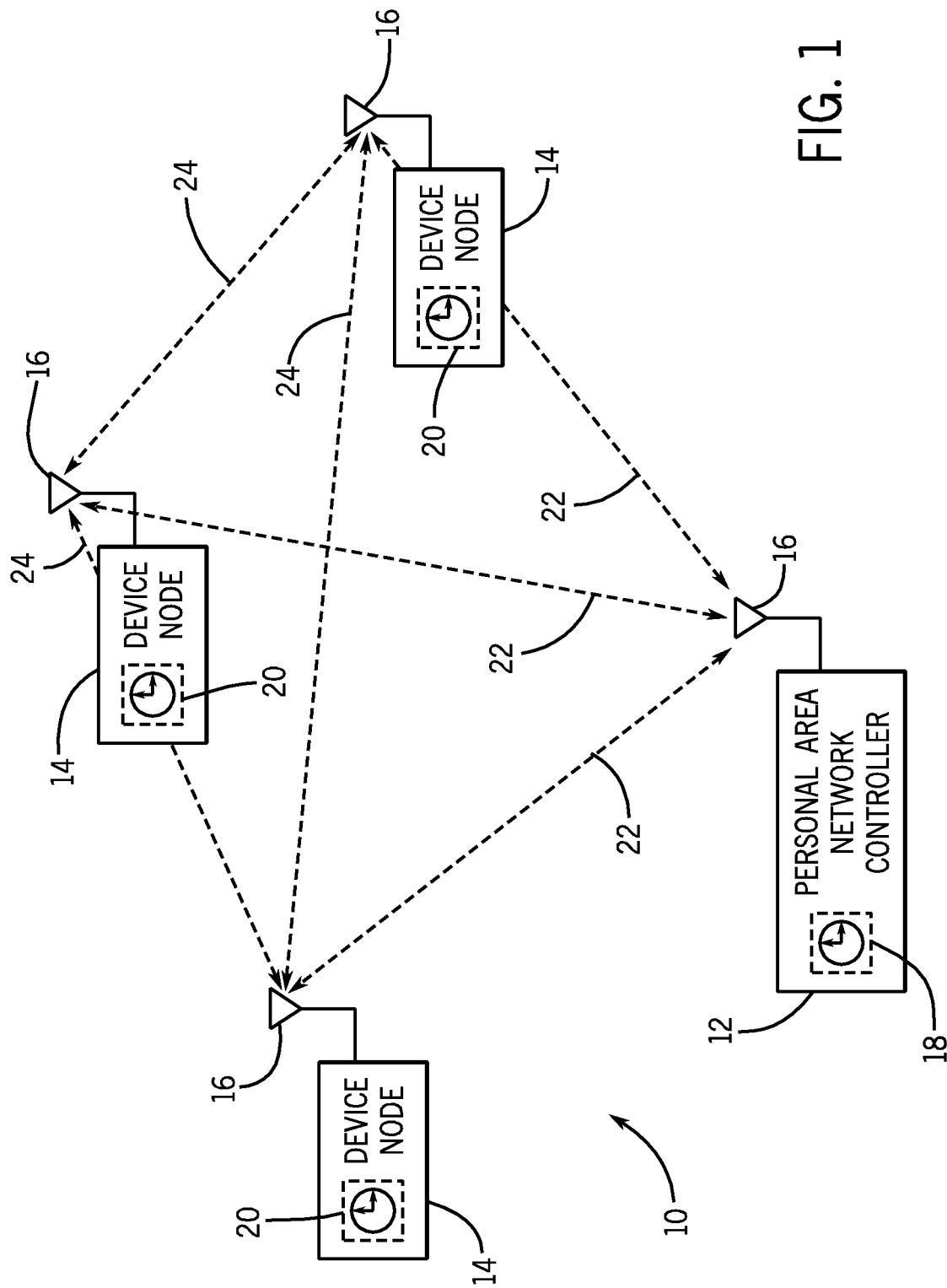
FIG. 1 is a block diagram of an embodiment of a beacon enabled wireless personal area network.

FIG. 1 is a block diagram of an embodiment of a beacon enabled wireless personal area network 10, which includes a network controller 12 and a plurality of device nodes 14. The network controller 12 and the device nodes 14 of the beacon enabled wireless personal area network 10 may include circuitry for performing not only relative synchronization for communication, but absolute synchronization as well. Moreover, the network controller 12 and the device nodes 14 may perform absolute synchronization without scheduling through the use of network beacons, as will be discussed further below.

As should be appreciated, in the beacon enabled wireless personal area network of FIG. 1, the network controller 12 and the device nodes 14 may represent any local devices. Generally, the network controller 12 may represent a master device, while the device nodes 14 may represent slave devices. The network controller 12 and the device nodes 14 may communicate wirelessly within the wireless personal area network 10 using wireless communication circuitry 16. The wireless communication circuitry 16 may enable communication using a protocol or standard. Generally, the protocol or standard may be any wireless personal area networking protocol or standard, which generally interconnect local devices using low bandwidth or low power communication, and may include, for example, IEEE communication standard 802.15.4.

The network controller 12 may include a master clock 18. Similarly, each of the device nodes 14 may include a local clock 20. Though the plurality of local clocks 20 may have been synchronized to the master clock 18 at one time, for various reasons, time kept by each of the local clocks 20 may diverge from that of the master clock 18 and each other. However, certain applications may benefit from maintaining the synchronicity of the local clocks 20 with the master clock 18. The local clocks 20 may be synchronized to the master clock 18 using an embodiment of a technique described further below.

Communication between the network controller 12 and the device nodes 14 may take place by way of communication channels 22. The wireless personal area network 10 may form a star-shaped topology, in which case the communication channels 22 form the sole communication which takes place over the wireless personal area network 10. However, the wireless personal area network 10 may also form a peer-to-peer network, in which case the device nodes 14 may communicate with each other using peer-to-peer communication channels 24.

The network controller 12 and the device nodes 14 may include a processor, such as a microprocessor or field programmable gate array, and may perform a variety of calculations in communication, including those techniques described herein. Both the network controller 12 and the device nodes 14 may include a memory device or a machine-readable medium such as Flash memory, EEPROM, ROM, CD-ROM or other optical data storage media, or any other appropriate storage medium which may store data or instructions for carrying out the techniques described below.

To facilitate communication, the network controller 12 may periodically send a wireless message called a beacon to the device nodes 14 over the communication channels 22. A beacon may convey network information to the device nodes 14, such as when certain communication may be scheduled to take place. Thus, the wireless personal area network 10 may be referred to as a beacon enabled wireless personal area network.

As noted above, the local clocks 20 of the device nodes 14 may diverge from the master clock 18 of the network controller. To ensure that the local clocks 20 of the device nodes 14 remain synchronized, the network controller 12 may send a message to the device nodes 14 over the communication channels 22. The message may contain a timestamp indicating the time of the master clock 18 at the moment the message is sent. The timestamp may be a timestamp, but may also be a soft or a software timestamp. As will be discussed in greater detail below, rather than the send the message using conventional two-way communication, the network controller 12 may send the message in a payload of the beacon.

In this way, the local clocks 20 may be synchronized to the master clock 18 without taking up scheduled communication time. Since non-beacon communication may involve the network controller 12 sending a message, the device nodes 14 replying with an acknowledgement, and the network controller 12 completing the communication with a follow up message, sending the synchronizing message in the payload of the beacon may conserve substantial resources. Moreover, if the device nodes 14 represent low power devices, which may benefit from entering a power save mode, the device nodes 14 may remain in power save mode for longer periods of time, as discussed further below.

Figure 2:
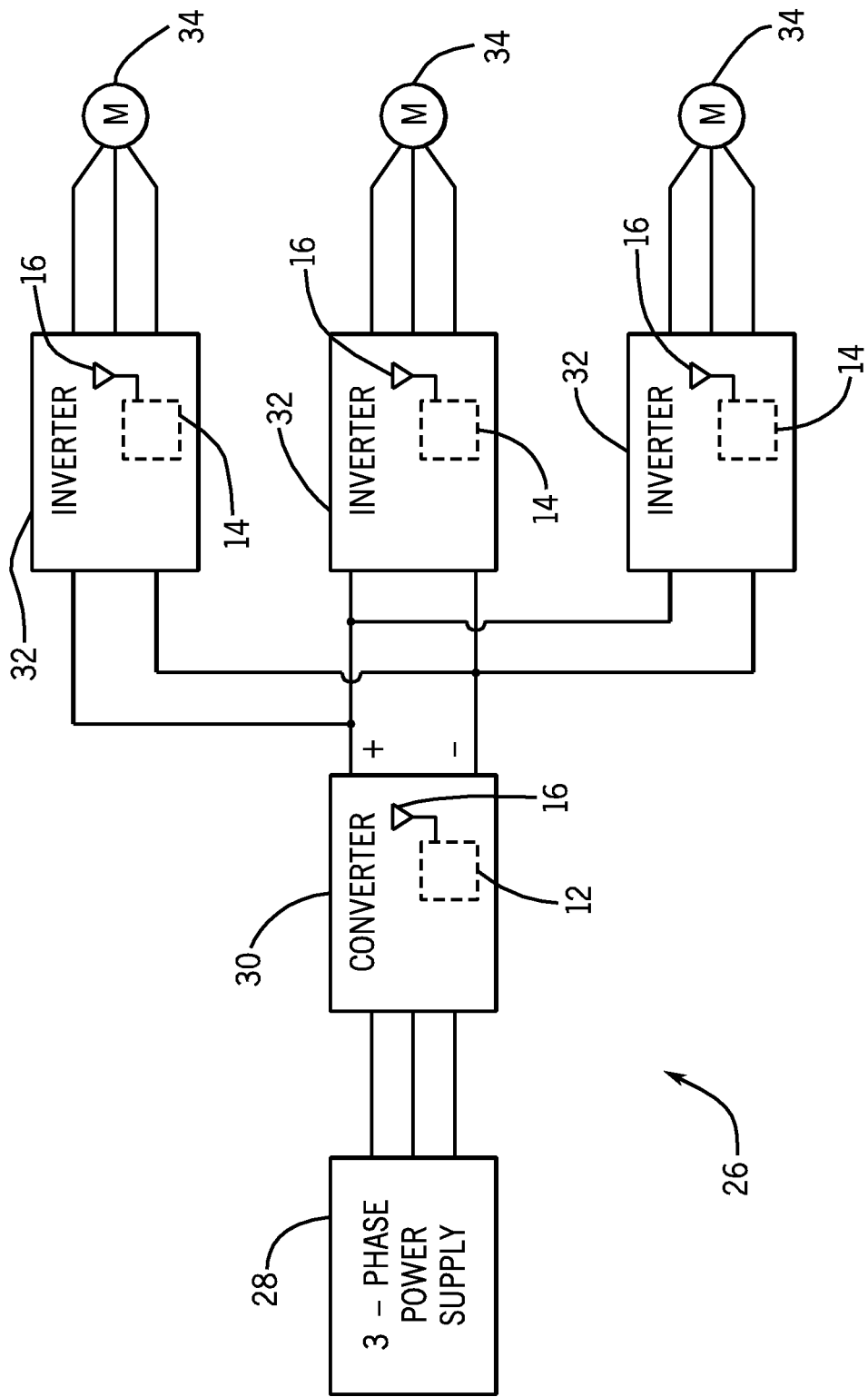
FIG. 2 is a block diagram of an embodiment of an exemplary motor control system employing the beacon enabled wireless personal area network of FIG. 1.

FIG. 2 is a block diagram of an embodiment of an exemplary motor control system 26 which may employ the wireless personal area network 10 of FIG. 1. As above, the motor control system 26 includes circuitry for maintaining absolute synchronicity between a clock located at a master device and clocks located at slave devices. The motor control system 26 may include a three-phase power supply 28, which may originate from a local generator or from a main electrical grid, for example. The three-phase power supply 28 may supply three-phase power to a converter 30, which may rectify the three-phase power into DC power. From the converter 30, the DC power may be sent to a DC bus to supply DC power to one or more inverters 32. The inverters 32 may thereafter output three-phase power at variable frequencies to respective motors 34.

The converter 30 and the inverters 32 may communicate over a wireless personal area network. Particularly, the inverters 32 may provide feedback data to the converter 30 regarding the power received over the DC bus. The wireless personal area network may be formed by the network controller 12, which may be located with the converter 30, and the device nodes 14, which may be located with the inverters 32. As discussed above, the network controller 12 and the device nodes 14 may communicate using respective wireless communication circuitry 16. A master clock of the network controller 12 and local clocks of the device nodes 14 may remain synchronized using the techniques described below.

Figure 3:
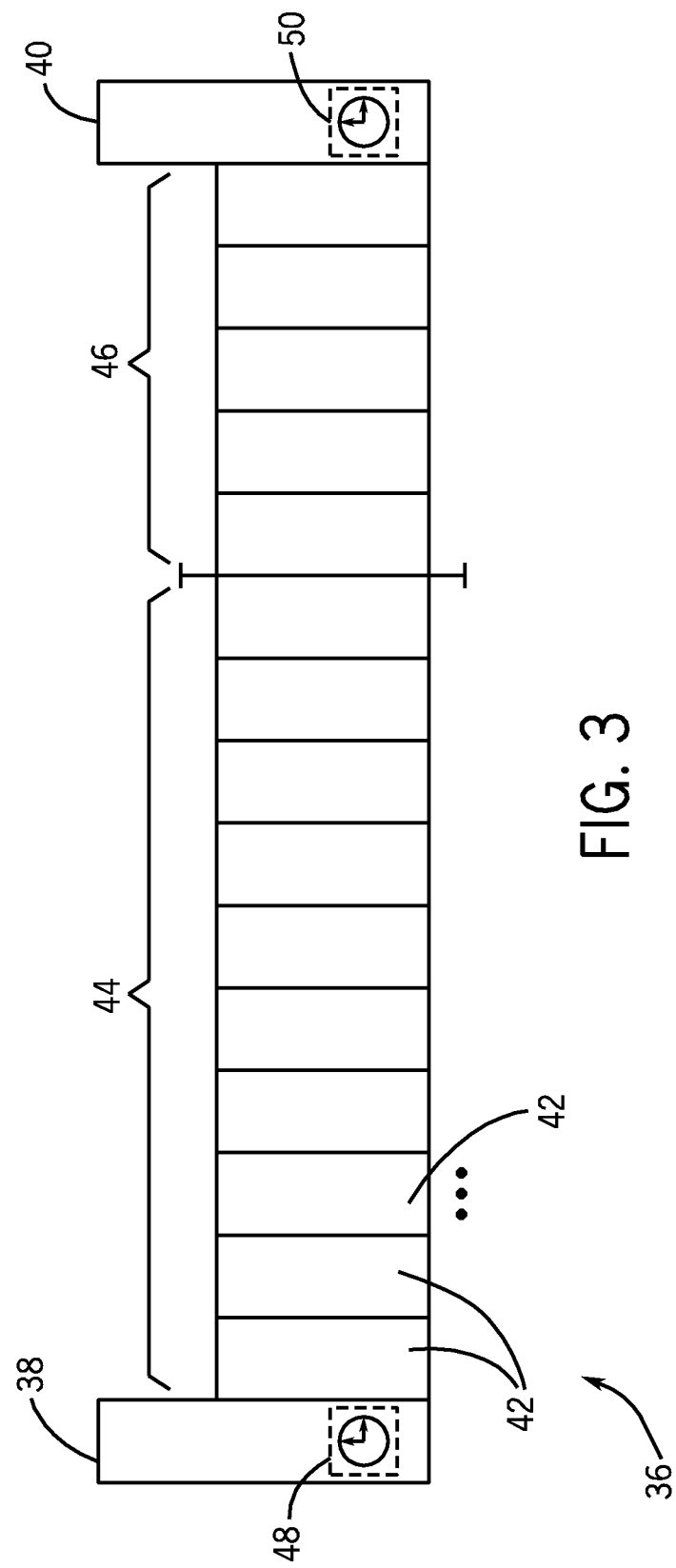
FIG. 3 is a schematic view of an embodiment of a superframe.

FIG. 3 represents a schematic view of a superframe 36, which may define when communication takes place in the wireless personal area network 10 of FIG. 1. A first beacon 38 marks the start of the superframe 36 and a second beacon 40 marks the end. The network controller 12 transmits the first beacon 38 and the second beacon 40 to all of the device nodes 14 of the wireless personal area network 10. The first beacon 38 may alert the device nodes 14 that designated communication is about to take place, and the second beacon 40 may alert the device nodes 14 that the designated communication time has terminated.

Between the first beacon 38 and the second beacon 40, a plurality of communication slots 42 delineate discrete designated communication time. During each communication slot 42, the network controller 12 or one of the device nodes 14 may transmit information, as scheduled by the network controller 12. For example, in a first of the communication slots 42, one of the device nodes 14 may receive a message from the network controller 12. In a later of the communication slots 42, the device node 14 may reply with an acknowledgement to the network controller 12 in response. As shown in FIG. 3, due to the nature of a beacon enabled personal area network, the superframe 36 includes only a limited number of communication slots 42.

The communication slots 42 may be grouped to permit only certain communication at certain times. For example, the communication slots 42 of a group 44 may form a contention access period, during which only one of the device nodes 14 or the network controller 12 may transmit information at any given time. The communication slots 42 of a group 46 may form a contention-free access period, during which the device nodes 14 may not be guaranteed a communication slot 80 free of other traffic. Alternatively, the communication slots 42 of the group 44 may instead be defined as "active," during which communication may be allowed, and the communication slots 42 of the group 46 may be defined as "inactive," during which no communication may be allowed. Defining the groups 44 and 36 as active and inactive may generally benefit low power devices, which may enter a power save mode during the communication slots 42 defined as inactive. The number of communication slots 42 for the groups 82 and 84 may vary, but the aggregate number of communication slots 42 in the superframe 42 may remain the same.

To synchronize the local clocks 20 of the device nodes 14 to the master clock 18 of the network controller 12, the first beacon 38 may include a synchronization message 48 in a special location within the first beacon 38 known as the beacon payload. The synchronization message 48 may include a hardware time stamp of the master clock 18 at the time when the network controller 12 transmits the beacon 38. The device nodes 14, upon receipt of the first beacon 38, may read the synchronization message 48 and set the respective local clocks 20 to the master clock 18. The network controller 12 may subsequently include a follow up message 50 in the beacon payload of the second beacon 40, with which the device nodes 14 may verify the time of the master clock 18 against the local clocks 20.

By sending the synchronization message 48 and the follow up message 50 in the first beacon 38 and the second beacon 40, respectively, the messages do not take up the limited communication slots 42. Moreover, by definition, all the device nodes 14 in a beacon enabled personal area network may receive beacons. As the device nodes 14 may not need to send replies, valuable communication slots 42 become available to other network communication. Additionally, as will be discussed further below, if any of the device nodes 14 operate as low power devices, further benefits may be realized since synchronization messages may not accumulate while in a power save mode.

Figure 4:
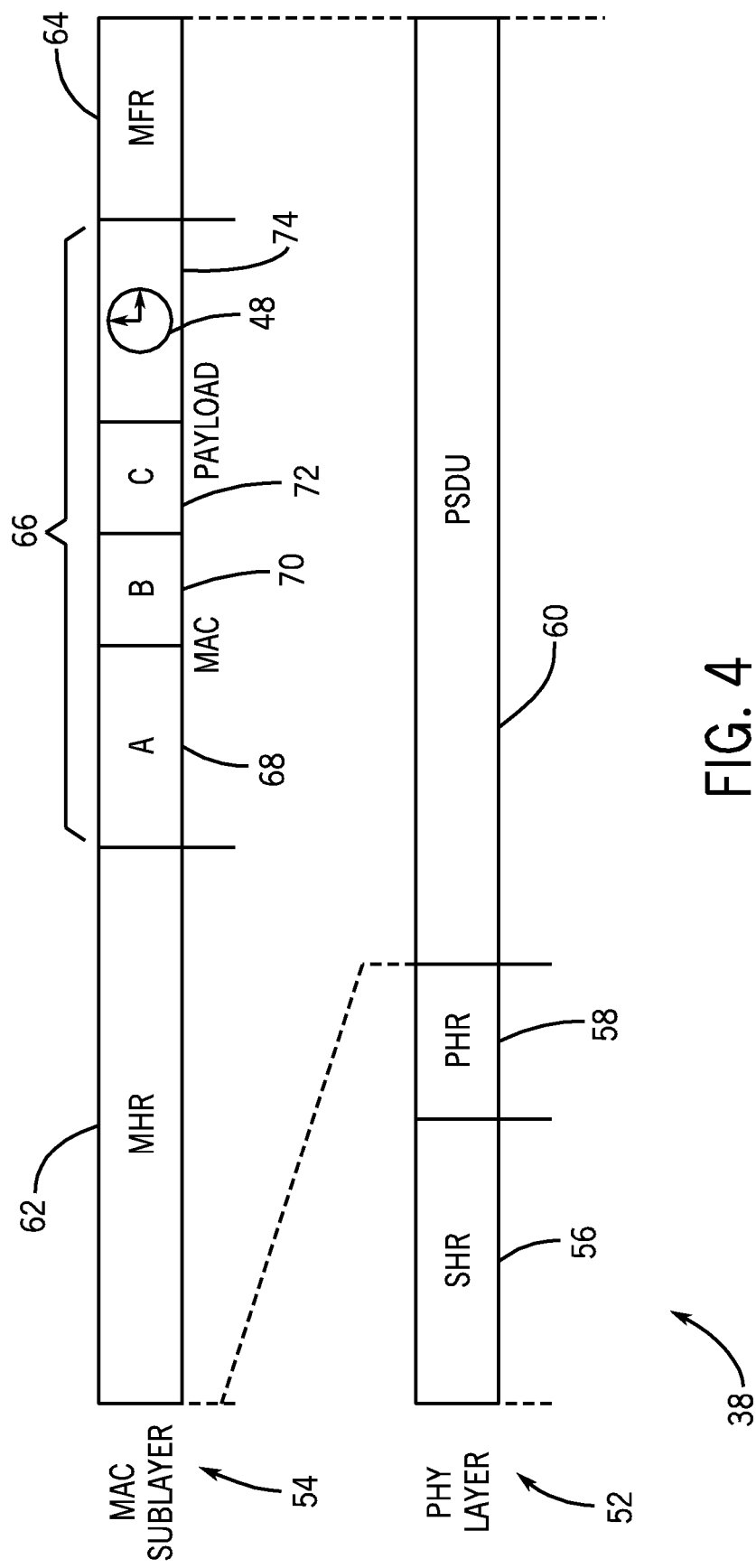
FIG. 4 is a schematic view of an embodiment of a beacon of the superframe of FIG. 3.

FIG. 4 is a schematic view of an embodiment of the first beacon 38. As noted above, the first beacon 38 may include the synchronization message 48, which may permit absolute synchronization between the local clocks 20 and the master clock 18. The first beacon 38 may include a physical (PHY) layer 52 which may include a medium access control (MAC) sublayer 54. The PHY layer 52 includes a synchronization header (SHR) 56, which may provide relative, rather than absolute, synchronization information to allow the device nodes 14 to lock onto the oncoming stream of digital information. The PHY layer 52 further includes a PHY header (PHR) 58, which indicates the length of the PHY payload, and a PHY service data unit (PSDU) 60, which represents a payload of the PHY layer 52.

The MAC sublayer 54 forms the PSDU 60. In the MAC sublayer 54, a MAC header (MHR) 62 and a MAC footer (MFR) 64 encapsulate a MAC payload 66. The MHR 62 may include a MAC frame controller yield, a beacon sequence number, addressing fields, and an auxiliary security header. The MFR 64 may include a frame check sequence to ensure the integrity of the message.

The MAC payload 66 may include information relating to upcoming communication in the superframe 36 and defining the first beacon 38. For example, the MAC payload 66 may include a superframe specification 68, a guaranteed slot (GTS) field 70, as well as pending address fields 72. Additionally, the MAC payload 66 may include a user specified data field known as a beacon payload 74. To synchronize the local clocks 20 of the device nodes 14 with the master clock 18 of the network controller 12, the beacon payload 74 may include the synchronization message 48, which represents a timestamp of the master clock 18 at the time when the network controller 12 sends the first beacon 38.

As noted above, the timestamp of the master clock 18 may be employed by the device nodes 14 to set the local clocks 20. In this way, the SHR 56 is used for synchronizing relatively to the incoming data stream of the first beacon 38, while the synchronization message 48 is used for synchronizing absolutely to the master clock 18.

Figure 5:
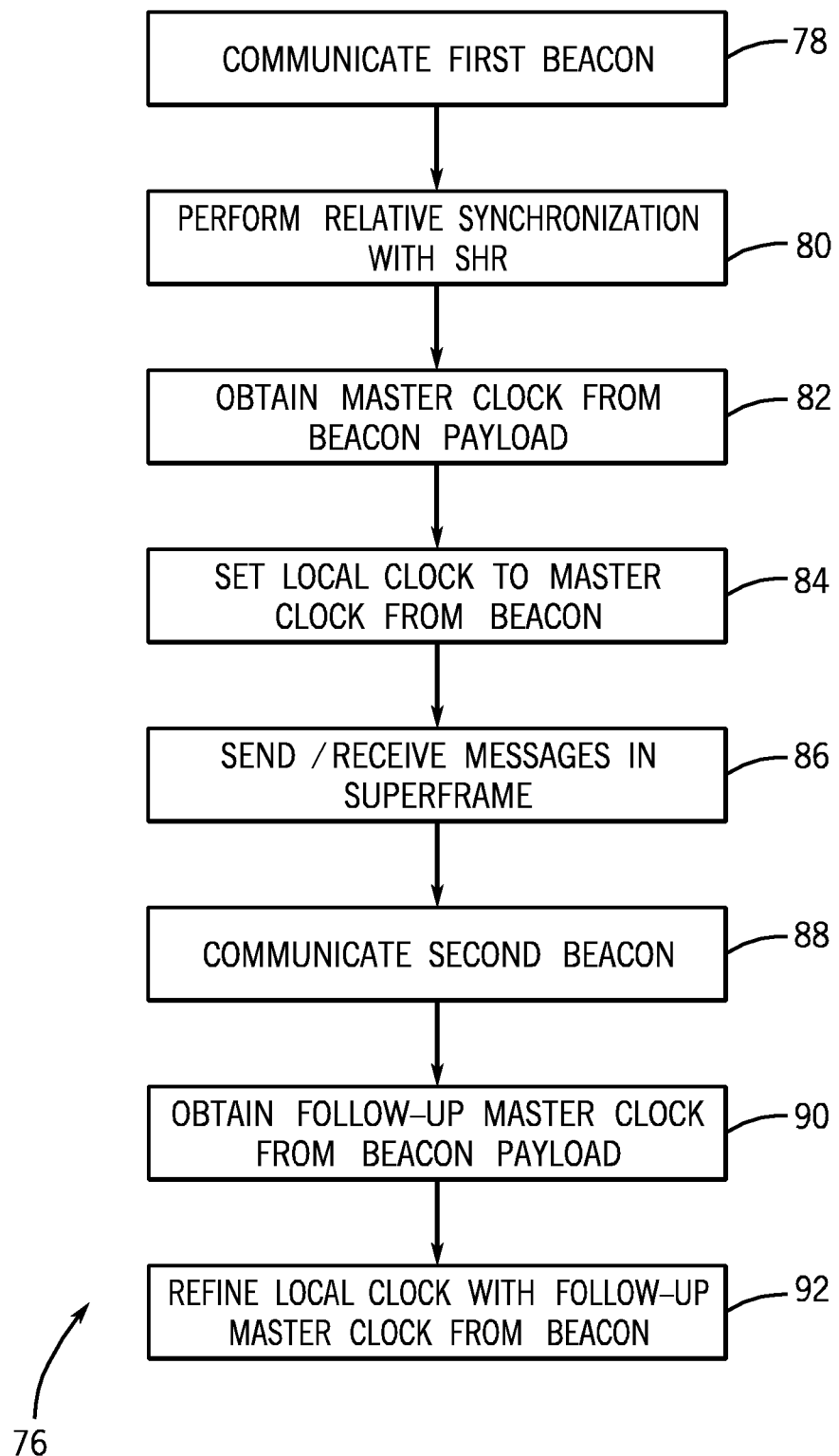
FIG. 5 is a flowchart of an embodiment of a method for synchronizing a local clock of a local device to a master clock.

FIG. 5 is a flowchart 76 illustrating an embodiment of a method for synchronizing the local clocks 20 to the master clock 18 using the synchronization message 48 in the beacon payload 74, rather than taking up valuable communication slots 42. In a first step 78, the network controller 12 may communicate the first beacon 38 to the device nodes 14. The first beacon 38 may signify the start of the superframe 36 and may include, among other things, information describing when communication may be scheduled during the superframe 36. In step 80, the device nodes 14 may perform a relative synchronization using the SHR 56 of the first beacon 38. In this step, the local clocks 20 may not be reset, but the device nodes 14 may lock onto the digital communication stream which makes up the first beacon 38 and the remainder of the superframe 36 which follows.

In a next step 82, the device nodes 14 may obtain the timestamp of the master clock 18 from the synchronization message 48, which may be located in the beacon payload 74 of the first beacon 38. In step 84, the device nodes 14 may subsequently set the local clocks 20 based on the time stamp of the master clock 18 from the synchronization message 48. It should be appreciated that by receiving the synchronization message 48 in the beacon payload 74, the device nodes 14 all may synchronize the local clocks 20 to the master clock 18 at once. Thus, substantial numbers of individual messages for synchronization need not be sent individually to each device node 14.

During step 86, the device nodes 14 may send and receive messages as scheduled in the various communication slots 42 of the superframe 36. As should be appreciated, the messages sent and received during step 86 do not include other synchronization messages, as those messages remain only in the first beacon 38 and the second beacon 40. In this way, extraneous synchronization messages do not preclude other legitimate messages from being communicated during the limited number of communication slots 42 of the superframe 36.

In step 88, the network controller 12 may communicate the second beacon 40 to the device nodes 14 may, which indicates the termination of the superframe 36. In step 90, the device nodes 14 may subsequently receive the follow-up message 50 from the payload of the second beacon 40. The follow-up message 50, in step 92, may allow the device nodes 14 to refine that the local clocks 20. During step 92, the local clocks 20 may be adjusted again to ensure synchronization to the master clock 18.

Figure 6:
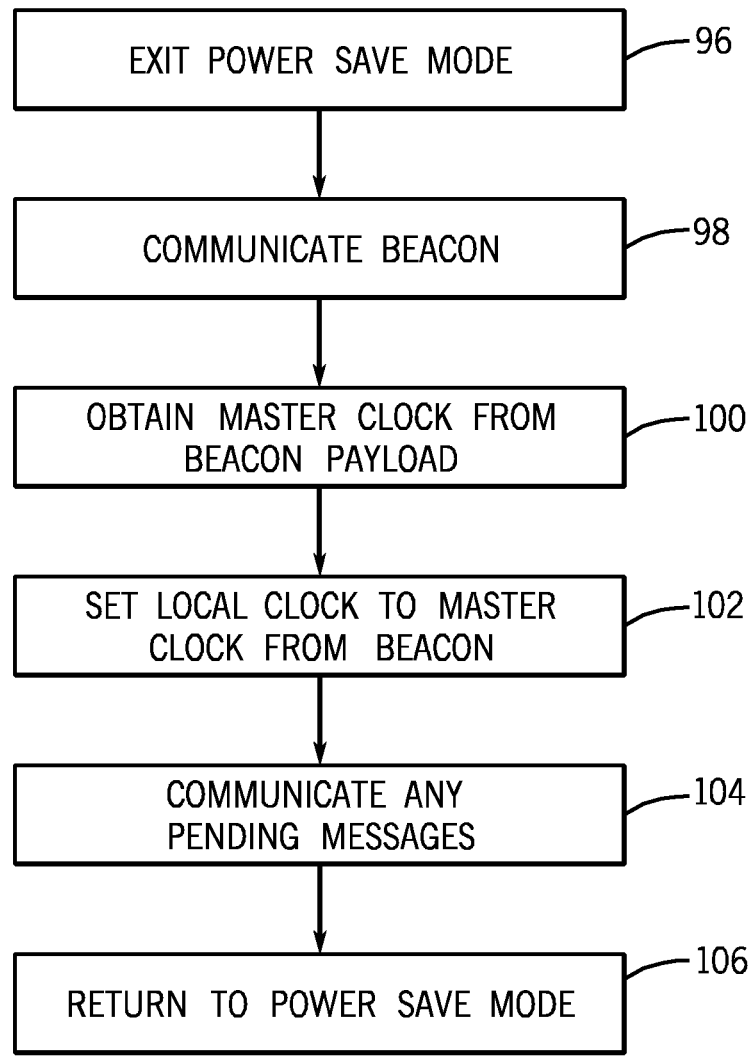
FIG. 6 is a flowchart depicting an embodiment of a method of synchronizing a local clock of a local device to a master clock in power save mode.

FIG. 6 is a flowchart 94 illustrating an embodiment of a method for synchronizing absolutely one or more of the device nodes 14 when the one or more device nodes 14 represents a low power device operating in a power save mode. As noted below, the one or more device nodes 14 may be synchronized using the synchronization message 48 in the beacon payload 74, rather than using valuable communication slots 42. In a power save mode, the one or more device nodes 14 may remain inactive for a certain specified number of beacons. The one or more device nodes 14 may exit the power save mode only occasionally to receive a beacon. As indicated, while operating in a power save mode, the one or more device nodes 14 may not communicate. In doing so, however, the one or more device nodes 14 may conserve substantial energy resources.

In a first step 96, the one or more device nodes 14 operating in a power save mode may exit from power save mode to listen for the first beacon 38. In step 98, the network controller 12 may communicate the first beacon 38 to the one or more device nodes 14. As in the flowchart 76 of FIG. 5, the first beacon 38 may signify the start of the superframe 36 and may include, among other things, information describing when communication may be scheduled in the communication slots 42 of the superframe 36. Additionally, because the network controller 12 may store any messages bound for the one or more device nodes 14 while operating in power save mode, the first beacon 38 may alert the one or more device nodes 14 of any pending messages.

In step 100, the one or more device nodes 14 may obtain the timestamp of the master clock 18 in the synchronization message 48, which may be located in the beacon payload of the first beacon 38. The one or more device nodes 14 subsequently may set the local clock 20 based on the timestamp of the master clock 18 in the synchronization message 48.

As noted above, the first beacon 38 may alert the one or more device nodes 14 of any pending messages sent while the one or more device nodes 14 were operating in power save mode. In step 104, if the network controller 12 holds pending messages for the one or more device nodes 14, the one or more device nodes 14 will remain active during the subsequent superframe 36 to receive the messages. In step 106, if no messages are pending, or after receiving the messages, the one or more device nodes 14 may return to power save mode.

Using the method depicted in the flowchart 94 of FIG. 6, the one or more device nodes 14 operating in power save mode will not be alerted to additional synchronization messages to be sent and received during the superframe 36. After having received the first beacon 38, the one or more device nodes 14 may synchronize the one or more local clocks 20 without occupying valuable communication slots 42 of the superframe 36. Additionally, by avoiding unnecessary messages during the superframe 36, the one or more device nodes 14 may return to power save mode, substantially reducing the amount of power consumed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for network synchronization comprising:
storing messages intended for a plurality of devices of a wireless personal area network;
wirelessly communicating a beacon over the wireless personal area network, wherein the beacon comprises a beacon payload having a timestamp of a master clock for synchronization of a local clock of at least one of the devices on the wireless personal area network, wherein the at least one of the devices is configured to:
exit from power save mode;
receive the beacon having the beacon payload;
obtain the timestamp of the master from the beacon payload;
set a local clock of the device based on the timestamp of the master clock;
determine from the beacon whether the device has pending messages to receive during a pending superframe;
remain active during the pending superframe if the device has at least one pending message; and
return to power save mode if the device has no pending messages to receive during the pending superframe.

2. The method of claim 1, comprising communicating another beacon comprising another beacon payload having a follow up message for synchronization of the local clock of the device.

3. The method of claim 1, wherein the beacon is communicated to the device, wherein the device is a low power device powered by a battery.

4. The method of claim 1, wherein wirelessly communicating the beacon comprises wirelessly communicating using an IEEE wireless communication standard 802.15.4.

5. The method of claim 1, wherein the beacon is communicated from a network controller having the master clock and wherein the network controller is disposed on a converter module.

6. The method of claim 1, wherein the beacon is communicated to the device and the device is disposed on an inverter module.

7. A system comprising:
a wireless personal area network controller having a master clock and configured to send a beacon comprising a beacon payload, the beacon payload including a timestamp of the master clock when the beacon is sent; and
a wireless personal area network device configured to:
exit from power save mode;
receive the beacon having the beacon payload;
obtain the timestamp of the master clock from the beacon payload;
set a local clock of the device based on the timestamp of the master clock;
determine from the beacon whether the device has pending messages to receive during a pending superframe;
remain active during the pending superframe if the device has at least one pending message; and
return to power save mode if the device has no pending messages to receive during the pending superframe.

8. The system of claim 7, wherein the timestamp is a hardware timestamp.

9. The system of claim 7, wherein the wireless personal area network controller is disposed on a converter module.

10. The system of claim 1, wherein the wireless personal area network device is disposed on an inverter module.

11. The system of claim 10, comprising another wireless personal area network device configured to:
exit from power save mode;
receive the beacon having the beacon payload;
obtain the timestamp of the master clock from the beacon payload;
set a local clock of the device based on the timestamp of the master clock;
determine from the beacon whether the device has pending messages to receive during a pending superframe;
remain active during the pending superframe if the device has at least one pending message; and
return to power save mode if the device has no pending messages to receive during the pending superframe.

12. The system of claim 7, wherein the wireless personal area network device is a low power device powered by a battery.

13. A method for network synchronization comprising:
exiting a device from power save mode;
receiving at the device a beacon having a beacon payload;
obtaining a timestamp of a master clock from the beacon payload;
setting a local clock of the device based on the timestamp of the master clock;
determining from the beacon whether the device has pending messages to receive during a pending superframe;
remaining active during the pending superframe if the device has at least one pending message; and
returning to power save mode if the device has no pending messages to receive during the pending superframe.

14. The method of claim 13, comprising synchronizing device communication relative to the beacon after receiving the beacon and before setting the local clock.

15. The method of claim 13, wherein the beacon is received using IEEE wireless communication standard 802.15.4.

16. The method of claim 13, wherein the beacon is received from a network controller having the master clock and wherein the network controller is disposed on a converter module.

17. The method of claim 13, wherein the beacon is received by the device and the device is disposed on an inverter module.

18. A non-transitory, machine readable storage medium tangibly embodying a sequence of instructions executable by the machine to perform a method, the method comprising:
storing messages intended for a plurality of devices of a wireless personal area network; and
wirelessly communicating a beacon over a wireless personal area network, wherein the beacon comprises a beacon payload having a timestamp of a master clock for synchronization of a local clock of a device of the plurality of devices on the wireless personal area network, wherein the device of the devices is configured to:
exit from power save mode;
receive the beacon comprising the beacon payload;
obtain the timestamp of the master from the beacon payload;
set a local clock of the device based on the timestamp of the master clock;
determine from the beacon whether the device has pending messages to receive during a pending superframe;

remain active during the pending superframe if the device has at least one pending message; and return to power save mode if the device has no pending messages to receive during the pending superframe.

19. The non-transitory, machine readable storage medium of claim 15 tangibly embodying the sequence of instructions executable by the machine to perform the method, wherein the method comprises sending a follow up message in a beacon payload of a second beacon to the device having the local clock.

20. A device comprising:
a storage for storing pending messages for other devices on a wireless personal area network; and
circuitry for wirelessly communicating a beacon over a wireless personal area network, wherein the beacon comprises a beacon payload having a timestamp of a master clock for synchronization of a local clock of the device, wherein the other devices are configured to:
exit from power save mode;
receive the beacon having the beacon payload;
obtain the timestamp of the master from the beacon payload;
set a local clock of the device based on the timestamp of the master clock;
determine from the beacon whether the device has pending messages to receive during a pending superframe;
remain active during the pending superframe if the device has at least one pending message; and
return to power save mode if the device has no pending messages to receive during the pending superframe.

21. The device of claim 20, wherein the device is a low power device powered by a battery.

* * * * *